(12) United States Patent
Nakashima et al.

(10) Patent No.: US 7,505,414 B2
(45) Date of Patent: Mar. 17, 2009

(54) NETWORK DESIGNING DEVICE AND COMPUTER-READABLE MEDIUM

(75) Inventors: Hisao Nakashima, Kawasaki (JP); Takeshi Hoshida, Kawasaki (JP); Yuichi Akiyama, Kawasaki (JP); Takafumi Terahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 632 days.

(21) Appl. No.: 10/992,829

(22) Filed: Nov. 22, 2004

(65) Prior Publication Data
US 2006/0023641 A1 Feb. 2, 2006

(30) Foreign Application Priority Data
Jul. 30, 2004 (JP) ............... 2004-223526

(51) Int. Cl.
H04L 12/28 (2006.01)

(52) U.S. Cl. ........................ 370/238; 370/254
(58) Field of Classification Search ............. 370/254
See application file for complete search history.

(56) References Cited

U.S. PATENT DOCUMENTS

| | | | | |
|---|---|---|---|---|
| 5,657,142 | A * | 8/1997 | Fahim | 398/9 |
| 5,923,646 | A * | 7/1999 | Mandhyan | 370/254 |
| 5,974,127 | A * | 10/1999 | Wernli et al. | 379/201.01 |
| 6,094,417 | A * | 7/2000 | Hansen et al. | 370/222 |
| 6,141,318 | A * | 10/2000 | Miyao | 370/217 |
| 6,185,193 | B1 * | 2/2001 | Kawakami et al. | 370/254 |
| 6,437,804 | B1 * | 8/2002 | Ibe et al. | 715/736 |
| 6,982,951 | B2 * | 1/2006 | Doverspike et al. | 370/217 |
| 7,293,090 | B1 * | 11/2007 | Saleh et al. | 709/226 |
| 2002/0036988 | A1 * | 3/2002 | Cardwell et al. | 370/238 |
| 2003/0046378 | A1 * | 3/2003 | Zimmel et al. | 709/223 |
| 2003/0193904 | A1 * | 10/2003 | Soga | 370/254 |
| 2005/0041600 | A1 * | 2/2005 | Moffatt et al. | 370/254 |
| 2005/0095008 | A1 * | 5/2005 | DeCusatis et al. | 398/164 |
| 2005/0169196 | A1 * | 8/2005 | Carpenter et al. | 370/255 |

FOREIGN PATENT DOCUMENTS

JP 2004-048477 2/2004

OTHER PUBLICATIONS

P. Arijs et al., "Design of Ring and Mesh Based WDM Transport Networks", Optical Networks Magazine, vol. 1, No. 3, pp. 25-40, Jul. 2000.
Takada, T. et al., "Network Design Tool," NEC Technical Journal, vol. 56, No. 2, pp. 1, 20-24, and 58 (7 pages).
Notice of Reason for Rejection dated Oct. 23, 2007 in corresponding Japanese Patent Application No. 2004-223526 (4 pages).
Japanese reference 2004-048477 cited in FORM-PTO 1449 attached hereto is discussed in the present application p. 4, line 5 (citation in p. 6).

* cited by examiner

*Primary Examiner*—Edan Orgad
*Assistant Examiner*—Timothy J Weidner
(74) *Attorney, Agent, or Firm*—Staas & Halsey LLP

(57) ABSTRACT

Linear networks are divided into a plurality of regeneration repeating sections which have nodes having regeneration repeaters arranged therein at both ends, devices such as linear repeaters or OADMs are arranged at the nodes positioned in the regeneration repeating sections, a plurality of assumed paths assumed as a result of arranging the devices are extracted in the regeneration repeating sections, and transmission permission/inhibition is determined transmission permission/inhibition is displayed to allow a user to perform settings again.

14 Claims, 19 Drawing Sheets

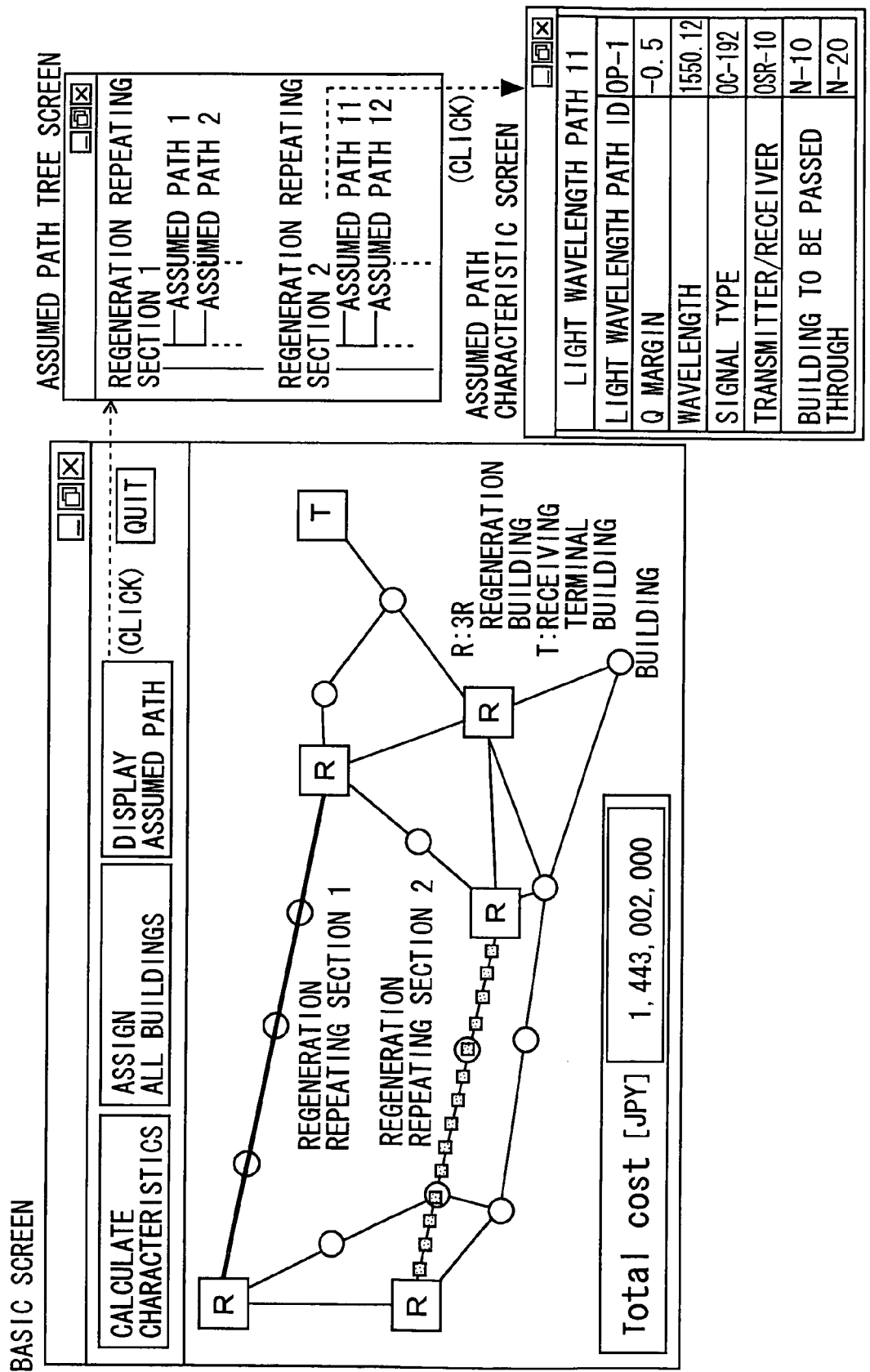

FIG. 8A

| TRANSMISSION LINE ID | BUILDING ID1 | BUILDING ID2 | FIBER TYPE | LENGTH | LOSS | WAVELENGTH DISPERSION | PMD |
|---|---|---|---|---|---|---|---|
| S-1 | N-1 | N-2 | SMF | 100 | 22 | 1700 | 1.0 |
| S-2 | N-2 | N-3 | SMF | 60 | 13 | 1000 | 0.8 |
| S-3 | N-3 | N-4 | SMF | 80 | 18 | 1300 | 0.9 |
| S-4 | N-4 | N-5 | SMF | 50 | 11 | 800 | 0.7 |

FIG. 8B

| BUILDING ID | LATITUDE | LONGITUDE | 3R SETTING FLAG | BUILDING TYPE | SUPPLIES MATERIAL | | |
|---|---|---|---|---|---|---|---|
| N-1 | 41.1 | -81.5 | 1 | OADM | DCM-1 | MD1 | EDFA1 | EDFA2 |
| N-2 | 33.72 | -117.9 | 0 | 1R | DCM-2 | EDFA1+DRA | | |
| N-3 | 45.22 | -95 | 0 | 1R | DCM-3 | EDFA1 | | |
| N-4 | 25.33 | -100.2 | 1 | 1R | DCM-4 | EDFA1 | | |
| N-5 | 47.62 | -89.97 | 0 | 3R | DCM-5 | MD1 | EDFA1 | EDFA2 |

FIG. 9A

| DEMAND ID | START POINT | END POINT | SIGNAL TYPE | NUMBER OF CHANNELS |
|---|---|---|---|---|
| D-1 | N-1 | N-12 | OC-192 | 1 |
| D-2 | N-20 | N-50 | OC-192 | 2 |
| D-3 | N-100 | N-200 | OC-48 | 1 |

FIG. 9B

| LIGHT WAVELENGTH PATH ID | Q MARGIN | SIGNAL TYPE | TRANSMITTER /RECEIVER | BUILDING TO BE PASSED THROUGH | | | | |
|---|---|---|---|---|---|---|---|---|
| OP-1 | 0.5 | OC-192 | OSR-10 | N-10 | N-20 | | | |
| OP-2 | 1.2 | OC-192 | OSR-10 | N-15 | N-15 | N-17 | | |
| OP-3 | 1.5 | OC-48 | OSR-24 | N-22 | N-23 | N-24 | N-25 | |

FIG. 10A

| ITEM | VALUE | | | |
|---|---|---|---|---|
| NUMBER OF WAVELENGTHS | 40 | | | |
| BAND | Cband | | | |
| USABLE WAVELENGTH | 1530.33 | 1531.12 | 1531.9 | ------ |
| TRANSMITTER/RECEIVER NAME OC-192 | OSR-10 | | | |
| TRANSMITTER/RECEIVER NAME OC-48 | OSR-24 | | | |

FIG. 10B

| TYPE OF TRANSMISSION SYSTEM | SUPPLIES MATERIAL TYPE NAME | | | |
|---|---|---|---|---|
| OADM | DCM | MUX/DEMUX | AMP1 | AMP2 |
| 1R | DCM | AMP1 | | |
| 3R | DCM | MUX/DEMUX | AMP1 | AMP2 |

FIG. 10C

| SUPPLIES MATERIAL TYPE NAME | OPTICAL COMPONENT CATEGORY | SUPPLIES MATERIAL NAME | | | | | |
|---|---|---|---|---|---|---|---|
| AMP1 | OPTICAL AMP | REDFA1 | REDFA2 | REDFA3 | REDFA1+DRA | REDFA2+DRA | REDFA3+DRA |
| AMP2 | OPTICAL AMP | TEDFA1 | TEDFA2 | | | | |
| DCM | DISPERSION COMPENSATOR | DCM-1 | DCM-2 | DCM-3 | DCM-4 | DCM-5 | |
| MUX/DEMUX | MUX/DEMUX | MD1 | | | | | |

FIG. 11A

| SUPPLIES MATERIAL NAME | NF | OUTPUT POWER (Psig) | INPUT POWER max | OUTPUT POWER min | COST |
|---|---|---|---|---|---|
| REDFA1 | | | | | |
| REDFA2 | | | | | |
| REDFA3 | | | | | |
| REDFA1 | | | | | |
| REDFA2 | | | | | |
| REDFA3 | | | | | |
| TEDFA1 | | | | | |
| TEDFA2 | | | | | |

FIG. 11B

| SUPPLIES MATERIAL NAME | DISPERSION | DISPERSION SLOPE | LOSS | COST |
|---|---|---|---|---|
| DCM-1 | | | | |
| DCM-2 | | | | |
| DCM-3 | | | | |
| DCM-4 | | | | |
| DCM-5 | | | | |

FIG. 12A

| SUPPLIES MATERIAL NAME | DISPERSION | LOSS | COST |
|---|---|---|---|
| MD1 | | | |

FIG. 12B

| SUPPLIES MATERIAL NAME | $\gamma_0$ | $\gamma_1$ | $\gamma_x$ | Be | Bo | Q VALUE IMPROVEMENT AMOUNT BY ERROR CORRECTION | COST |
|---|---|---|---|---|---|---|---|
| OSR-10 | | | | | | | |
| OSR-24 | | | | | | | |

NETWORK DESIGNING DEVICE AND COMPUTER-READABLE MEDIUM

BACKGROUND OF THE INVENTION

The present invention relates to a technology which is effectively applied to a network designing device or a network designing method for supporting optimizing design of an optical communication network.

There is a demand for a technology which enables use of various multimedia services at any time or place. As one of such technologies, a photonic network technology is available, which enables high-speed and inexpensive communication of a large amount of information. Among photonic network technologies, there have been developed a Wavelength Division Multiplexing (WDM) technology which multiplexes and communicates a plurality of optical signals different from one another in wavelength through one optical fiber, and a photonic node technology which constructs a network by regarding each wavelength as one communication path. The development of such technologies has brought about a need to realize a communication network system (hereinafter called communication network) which minimizes equipment introduction expenses (equipment costs) while maintaining high reliability for signal reachability.

The communication network is constituted by using a linear repeater (1R), a regeneration repeater (regenerator, 3R), an Optical Add/Drop Multiplexer (OADM), and the like. Each device is arranged in a predetermined building.

The linear repeater amplifies a signal which it has received by a predetermined gain to compensate for signal attenuation. In the linear repeater, noise mixed in a main signal may be amplified with the main signal by signal amplification. Consequently, in the linear repeater, a signal-to-noise ratio (SN ratio) may be deteriorated to disable regeneration on a reception side.

The regeneration repeater includes a regenerator. The regeneration repeater first divides a multiple signal which it has received among channels. Next, the regeneration repeater executes light-to-electricity conversion for each channel by the regenerator, and executes signal regeneration, regenerated signal amplification, and electricity-to-light conversion. In the regeneration repeater, the deterioration of the SN ratio is prevented since the signal regeneration is executed. The regeneration repeater is more expensive than the linear repeater. Accordingly, it is possible to reduce equipment costs by decreasing the number of regeneration repeaters in the network designing.

The OADM separates a wavelength channel to be terminated as a client signal from the wavelength-multiplexed optical signal. Additionally, the OADM adds a wavelength channel requested to be transmitted by a client side as a part of the wavelength-multiplexed signal. At this time, signal regeneration and regenerated signal amplification by the regenerator are executed when necessary. When the number of routes of a wavelength multiplexing transmission line fiber pair connected to the repeater exceeds two, the OADM may be referred to as a HUB, a multipath OADM, a WXC, or the like.

The HUB converts a signal received by a building in which there is a traffic demand into a client signal. Additionally, the HUB branches a path into a proper route. The HUB may include a regenerator for each channel. When necessary, the HUB executes signal regeneration or regenerated signal amplification by the regenerator. A regenerator needs not be always disposed for each channel of the HUB. Accordingly, it is possible to reduce equipment costs by decreasing the number of regenerators disposed for the channels.

Next, a conventional network designing method will be specifically described. Non-Patent document 1 describes a conventional designing method of a communication network. In the Non-Patent document 1, first, HUB's are installed in all buildings in which there are traffic demands. The HUB includes regenerators for all the channels to execute signal regeneration and regenerated signal amplification. Next, a strength loss only of a multiplexed signal is checked. Based on a result of the check, a linear repeater and a regeneration repeater are installed between the buildings. Then, through a network in which signal reachability is guaranteed among all the buildings, shortest-distance path routing is executed. In the Non-Patent document 1, network resources such as a band and the number of wavelengths are efficiently used by such a method.

As another example of a conventional designing method, there is a technology described in Patent document 1. According to the technology, regarding a communication network which has a meshed geometrical shape, by checking a signal quality for each optical path, a highly efficient communication network system is designed by decreasing redundant regenerators in the HUB. FIGS. 14 to 16 show a basic principle of a conventional network designing method. FIG. 14 is a diagram showing an example of a main function block of a conventional communication network designing device P1. FIG. 15 is a diagram showing an example of a model of a conventional communication network. FIG. 16 is a diagram showing an arrangement example of regenerators in a conventional HUB. In FIG. 16, the regenerator is mounted for each channel in the HUB. FIG. 17 is a flowchart showing a designing process by the conventional communication network designing device P1.

To begin with, topology information, traffic demand information, signal performance information, or the like is input to the communication network designing device P1 (SP1) Next, a section dividing section P2 routes a shortest-distance path, and allocates a proper wavelength based on used link (SP2). In the case of the communication network shown in FIG. 15, the section dividing section P2 assumes that there are 1-channel traffic demands between terminal nodes P5 and P13 and between terminal nodes P5 and P15, and sets a path according to the assumption. Next, the section dividing section P2 arranges devices which terminate all the channels at nodes of a linear degree 1 or 3, i.e., a terminal node and a branch node (SP3). Specifically, the section dividing section P2 arranges terminal devices at the terminal nodes P5, P13 and P15, and arranges regenerators for all the channels of the HUB at a branch node P9. By this process, the communication network to be processed is divided into linear sections in which the node of the linear degree 1 or 3 is a terminal building (referred to as "linear sections", hereinafter) (SP4). In the case of FIG. 15, the communication network is divided into 3 sections, i.e., the terminal node P5 and the branch node P9 (first linear section), the terminal node P13 and the branch node P9 (second linear section), and the terminal node P15 and the branch node P9 (third linear section).

Next, a section designing section P3 efficiently arranges a linear repeater and a regeneration repeater in each divided linear section by using a conventional technology (SP5). Subsequently, the section designing section P3 combines the divided sections. Next, a regenerator arrangement changing section P4 calculates an accumulated value of signal-to-noise ratios in the buildings for each path. Then, the regenerator arrangement changing section P4 removes regenerators from a section before a regenerator in which the accumulated value becomes maximum which does not exceed a prescribed value (SP6, SP7). In the case of FIG. 15, the regenerator arrangement changing section P4 checks signal performance between the terminal nodes P5 and P13 and between the terminal nodes P5 and P15 for each path, and removes a redundant regenerator from the branch node P9. Then, the communication network designing device P1 creates and outputs a list of components for the device arranged at each node (SP9). As a result, as shown in FIG. 16, the HUB at the branch node P9 is constituted in such a manner that a regenerator is implemented for a partial channel. Thus, equipment introduction expenses are reduced by an amount equivalent to the cost of the regenerators removed.

[Patent Document 1]

Japanese Patent Application Laid-Open Publication No. 2004-048477

[Non-Patent Document 1]

P. Arijs, B. Van Caenegem, P. Demeester, P. Lagasse, W. Van Parys and P. Achten, "Design of ring and mesh based WDM transport networks," Optical Networks Magazine, Vol. 1, No. 3, pp. 25-40, Jul. 2000.

SUMMARY OF THE INVENTION

However, optical signal characteristics in an optical transmission system are determined by noise light accumulation which accompanies multistage connection of an optical transmission device, and accumulation of complex physical phenomena such as optical fiber wavelength dispersion, polarized wave dispersion, or non-linear effects. Thus, in the conventional method, reduction effects of the network equipment costs by the removal of regenerators greatly depend on a designing result of line shape sections (linear sections). FIGS. 18 and 19 show specific examples of problems in the conventional network designing method. In FIGS. 18 and 19, a 3R section means a section both ends of which are held between the regeneration repeaters in a given linear section. Specifically, the 3R section means a section between the terminal node and the node in which the regeneration repeater is installed, or a section between the branch node P9 and the node in which the regeneration repeater is installed.

Regarding a case in which a regeneration repeater needs to be arranged in only one place in the linear section, FIG. 18 shows a designing example in which a regeneration repeater is arranged as close as possible to a particular node of high priority (branch node P9 in this case). Regarding the same case, FIG. 19 shows a designing example in which regeneration repeaters are arranged so that signal characteristics thereof are similar in a linear section. According to the designing result of FIG. 18, since a node P8 in which a regeneration repeater is installed in a first linear section, and a node P10 in which a regeneration repeater is installed in a second linear section are close to each other, there is a high possibility that regenerators can be removed from the HUB. On the other hand, according to the designing result of FIG. 19, since a node P7 in which a regeneration repeater is installed in the first linear section and a node P11 in which a regeneration repeater is installed in the second linear section are apart from each other, there is a low possibility that regenerators can be removed from the HUB. In the case of FIG. 18, however, transmission distances of a first 3R section and a fourth 3R section must be set long. Here, for an optical amplifier used for the linear repeater, the regeneration repeater, or the like, it is assumed that there are a high-quality product of good noise characteristics but high costs, and an ordinary product of inferior noise characteristics but relatively low costs. For example, for the former, there is a hybrid amplifier which uses a distribution Raman amplifying technology and an EDFA technology in combination. For the latter, there is a case of using an EDFA only, or the like. According to the assumption, there is a high possibility that high-quality optical amplifiers will be necessary in the first 3R section and the fourth 3R section of FIG. 18. On the other hand, in FIG. 19, since the first to fourth 3R sections are shorter compared with the first and fourth 3R sections of FIG. 18, there is a low possibility that high-quality optical amplifiers will be necessary. Thus, an optimal designing result varies in costs of network designing according to a price of the regenerator in the HUB and a price of the high-quality optical amplifier. In other words, for example, even when the number of regenerators in the HUB is designed to be minimum, if numerous high-quality optical amplifiers are necessary in consequence, optimal designing is not achieved.

As described above, equipment expenses of the entire network vary depending on a place of the node in the linear section in which the regeneration repeater is installed. An optimal state thereof is different depending on the topology and traffic demand information of the communication network, transmission line characteristics, performance and costs of the transmission device, and the like. It is therefore an object of the invention to provide a network designing device which can pursue optimal installation of regeneration repeaters in a particular network while checking signal quality reachability of a path therein.

To solve the problems, the present invention employs the following constitution. According to a first aspect of the invention, a network designing device includes a linear dividing unit, an input unit, a regeneration repeating section dividing unit, a device arranging unit, a path extracting unit, a determining unit, and a display unit. The linear dividing unit divides a network to be designed into a plurality of linear networks which have preset terminal nodes or branch nodes at both ends. The terminal node is a node of a linear degree 1, while the branch node is a node of a linear degree of 3 or more. The input unit allows a user to assign arrangement of regeneration repeaters or supplies materials thereof at the nodes in the linear networks. The regeneration repeating section dividing unit divides the linear networks into a plurality of regeneration repeating sections which have nodes in which regeneration repeaters are arranged in both ends, according to a user's input. The device arranging unit arranges transmission devices at the nodes positioned in the regeneration repeating sections based on traffic information, building information, or transmission line information input by the user. The path extracting unit extracts a plurality of assumed paths assumed based on the result of arranging the transmission devices in the regeneration repeating sections. The determining unit determines transmission permission/inhibition for each assumed path. The display unit displays a result of determination performed by the determining unit.

Thus, according to the first aspect of the invention, the user can optimally install a regeneration repeater for a particular network while checking the result of the transmission permission/inhibition determination displayed by the display unit.

Further, according to the first aspect of the invention, the determining unit may be adapted to calculate a Q value indicating characteristics of an optical signal for each assumed path, and determine transmission permission/inhibition based on the Q value. By the adaptation, the user can easily check the transmission permission/inhibition determination based on the Q value, and accurately install the regeneration repeaters.

Further, according to the first aspect of the invention, the display unit may be adapted to display supplies materials of devices prestored in a database when the user selects the supplies materials of devices through the input unit. By the adaptation, the user can easily select the supplies materials of devices.

According to a second aspect of the present invention, a network designing device includes a linear dividing unit, a regeneration repeater assigning unit, a regeneration repeating section dividing unit, a device arranging unit, a path extracting unit, a determining unit, a selecting unit, and a display unit. The linear dividing unit divides a network to be designed into a plurality of linear networks which have preset terminal nodes or branch nodes at both ends. The regeneration repeater assigning unit assigns arrangement of regeneration repeaters or supplies materials thereof at the nodes in the linear networks according to a plurality of different algorithms. The regeneration repeating section dividing unit divides the linear networks into a plurality of regeneration repeating sections which have nodes in which regeneration repeaters are arranged in both ends, according to an assignment prepared by the regeneration repeater assigning unit. The device arranging unit arranges transmission devices at the nodes positioned in the regeneration repeating sections based on pre-input traffic information, building information, or transmission line information. The path extracting unit extracts a plurality of assumed paths assumed based on the result of arranging the transmission devices in the regeneration repeating sections. The determining unit determines transmission permission/inhibition for each assumed path. The selecting unit selects one optimal network design from network designs which are designed according to the plurality of different algorithms, based on a result of the transmission permission/inhibition determination and costs for construction. The display unit displays at least a determining result for the network design selected by the selecting unit.

Thus, according to the second aspect of the invention, even when the user does not assign supplies materials or arranging positions of the regeneration repeaters, the regeneration repeater assigning unit automatically executes such assignment. Moreover, even when the user does not investigate propriety of the network designing result based on the result of the transmission permission/inhibition determination, the selecting unit selects one of network designs which are designed according to the plurality of different algorithms based on the predetermined standard. Accordingly, an optimal network design can be obtained without any burdens on the user.

The first and second aspects may be realized by causing an information processor to execute a program. That is, the invention can be specified as a program which causes the information processor to execute the processing performed by each unit according to the first and second aspects, or a recording medium recording the program. Additionally, the invention may be specified as a method of causing the information processor to execute the processing performed by each unit.

According to the invention, the user can optimally install regeneration repeaters in the particular network while checking the determining result of transmission permission/inhibition displayed by the display unit.

DESCRIPTION OF THE DRAWINGS FIG

FIG. 7 is a diagram showing a display example of the transmission permission/inhibition determining result;

FIG. 8A and FIG. 8B are views showing specific examples of a network information database;

FIG. 9A and FIG. 9B are views showing specific examples of the network information database;

FIG. 10A, FIG. 10B and FIG. 10C are views showing specific examples of a device information database;

FIG. 11A and FIG. 11B are views showing specific examples of the device information database;

FIG. 12A and FIG. 12B are views showing specific examples of the device information database;

DETAILED DESCRIPTION OF THE INVENTION

First, description will be made of a network which is a designing target of a network designing device 1 of the invention. The network to be processed includes a terminal node, a branch node, and a general node. Each node indicates a building. Accordingly, a device to be installed in the building is allocated to each node. In other words, in reality, the device allocated to the node in network designing is arranged in the building.

The nodes are interconnected via a link. The link indicates a fiber. In other words, in reality, the fiber is installed as the link, and the buildings or the devices therein are interconnected through the fiber to communicate with one another.

A terminal device is allocated to each terminal node. An HUB is allocated to the branch node. As a result of the network designing, a linear repeater or a regeneration repeater that has a constitution assigned by a user is allocated to the general node.

Figure 1:
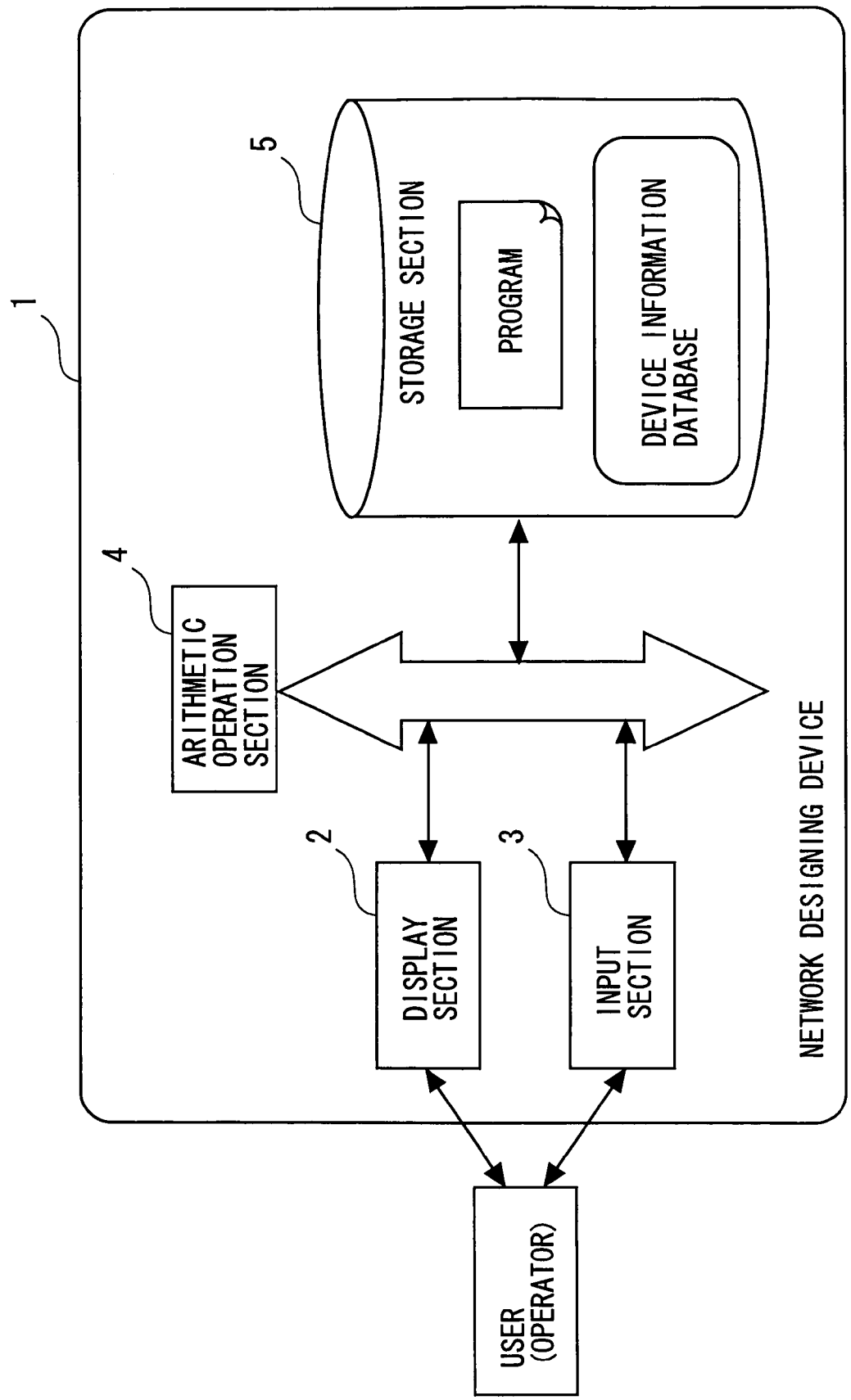
FIG. 1 is a diagram showing a hardware block of a network designing device according to the invention.

Next, a constitutional example of the network designing device 1 will be described. FIG. 1 is a diagram showing a hardware block of the network designing device 1 of the invention. The network designing device 1 is constituted by using, e.g., an information processor such as a personal computer or a workstation. The network designing device 1 includes, in terms of hardware, a display section 2, an input section 3, an arithmetic operation section 4 (CPU), and a storage section 5 (main memory (RAM), auxiliary memory (flash memory, hard disk), or the like), which are connected to one another through a bus.

<Display Section>

The display section 2 operates as a user interface. The display section 2 is constituted by using a liquid crystal display, a Cathode Ray Tube (CRT), and an output device such as a printer. The display section 2 outputs a processing result or the like of the arithmetic operation section 4.

<Input Section>

The input section 3 is operated by a user to pass various commands, data, or the like to the arithmetic operation section 4. As examples of data input from the input section 3, there are topology information, traffic information, transmission line information, device arrangement conditions of each building, and the like. The input section 3 is constituted by using, e.g., an input device (e.g., keyboard and pointing device) as a user interface, a network interface (e.g., LAN interface and WAN interface), various drives (e.g., floppy disk drive, CD-ROM drive, DVD-ROM drive, MO drive, and flash memory reader), and the like.

<Arithmetic Operation Section>

Figure 2:
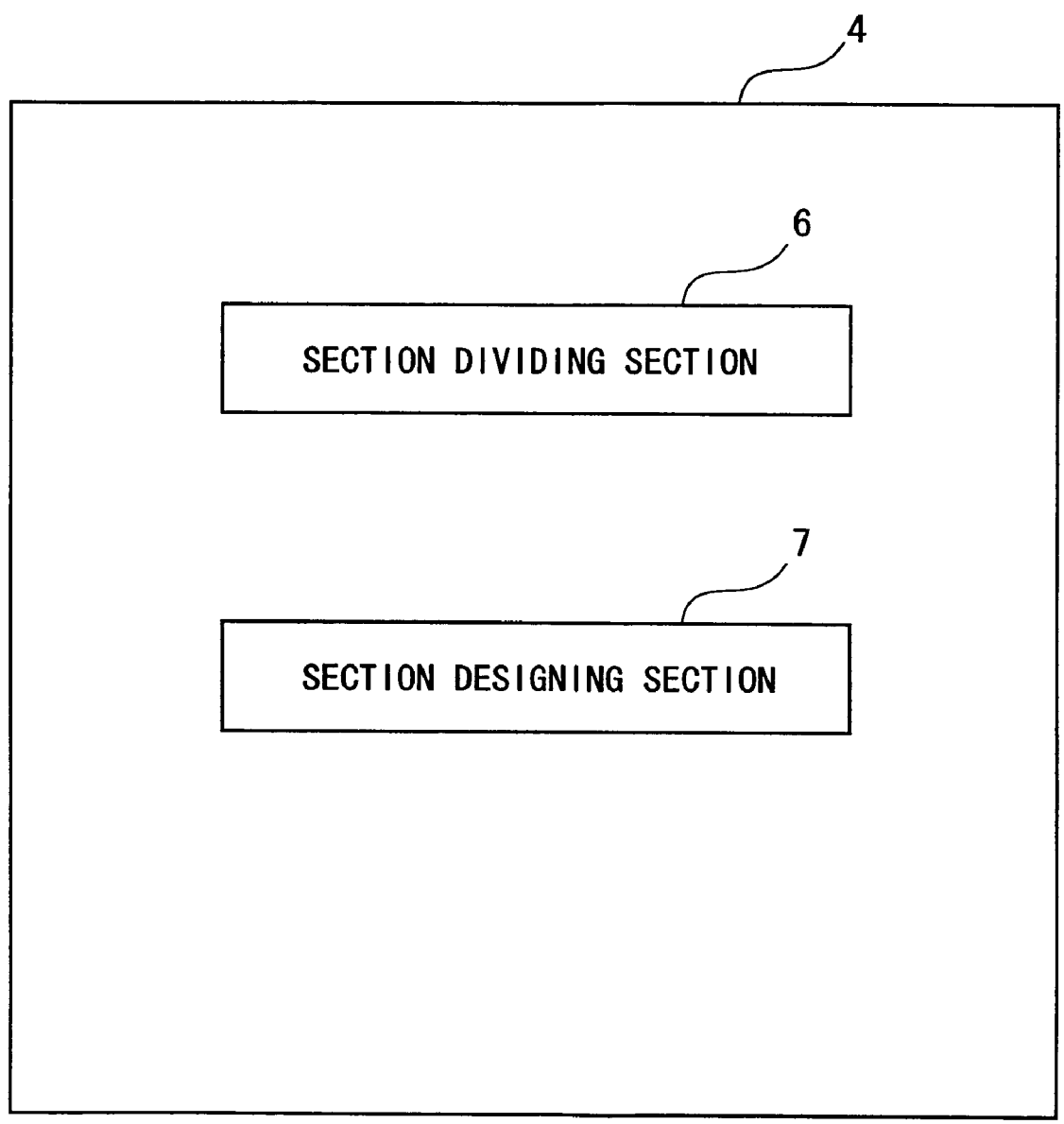
FIG. 2 is a diagram showing a function block in an arithmetic operation section of the network designing device.
Figure 3:
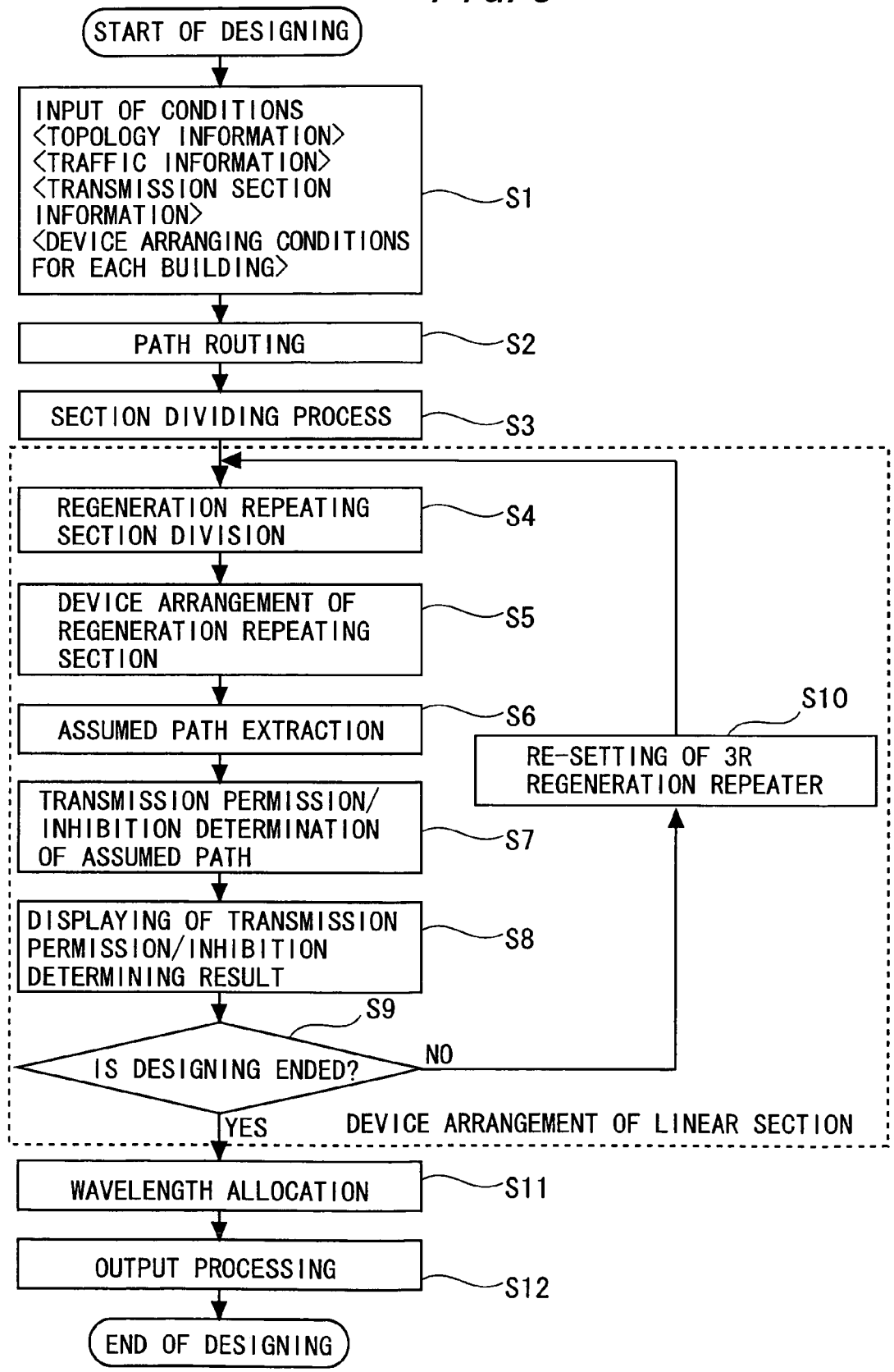
FIG. 3 is a diagram showing an example of a flowchart of a process executed by the arithmetic operation section of the network designing device.

FIG. 2 is a diagram showing a function block in the arithmetic operation section 4 of the network designing device 1. The arithmetic operation section 4 executes a program of the invention, stored in the storage section 5 to operate as a section dividing section 6 and a section designing section 7. FIG. 3 is a diagram showing an example of a flowchart of a process executed by the arithmetic operation section 4 of the network designing device 1. Hereinafter, referring to FIGS. 2 and 3, the arithmetic operation unit 4 will be described. In the description below, arrangement of a device at a node (building) means not actual physical arrangement of a device at the node but virtual arrangement of a device at the node in the information processor.

Upon a start of network designing, first, conditions are input through the input section 3 (S1). The arithmetic operation section 4 executes processing based on the input conditions or the like. After the input of the conditions, first, the section dividing section 6 executes processing. The section dividing section 6 first executes path routing (S2). The path routing is executed based on transmission line information or the like. In the execution of the path routing, the section dividing section 6 routes a shortest-distance path based on the transmission line information or the like, and allocates a proper wavelength via a link. A path to be designed is decided by the execution of the path routing. Next, the section dividing section 6 executes section dividing processing (S3). By the execution of the section dividing processing, a network to be designed is divided into 1 or more linear sections. Specifically, the section dividing section 6 arranges devices to terminate all channels at nodes of a linear degree of 1 or 3 or more, i.e., a terminal node and a branch node. For example, the section dividing section 6 may allocate a HUB to the branch node. A regenerator is allocated to each channel in the HUB. Additionally, for example, the section dividing section 6 may arrange a terminal device at the terminal node. By such arrangement, the network to be processed may be divided into linear sections to interconnect the terminal nodes or the branch nodes. In other words, by the execution of the section dividing processing, the network having the branch nodes is divided into 1 or more linear sections at the boundaries of the branch nodes.

The section designing section 7 executes section designing processing to arrange devices in the linear sections (line shape sections). That is, by executing the section designing processing, the section designing section 7 allocates a linear repeater or a regeneration repeater which has a constitution assigned by the user to a general node constituting each linear section. Then, the section designing section 7 displays transmission permission/inhibition determination for the network constitution. Hereinafter, the section designing processing executed by the section designing section 7 will be specifically described.

In the section designing processing, the section designing section 7 first executes regeneration repeating section division (S4). In the processing of the regeneration repeating section division, the section designing section 7 arranges a regeneration repeater assigned by the user at a general node assigned by the user. Then, each linear section is divided into a plurality of regeneration repeating sections in which the general node having the regeneration repeater arranged therein is an end point. For example, when one regeneration repeater is arranged in one linear section, the linear section is divided into two regeneration repeating sections. At this time, the arrangement of all the regeneration repeaters may be assigned by the user, or executed in a manner that the user corrects the arrangement based on arrangement implemented beforehand by the section designing section 7 according to a predetermined algorithm. The predetermined algorithm may be, e.g., an arranging method which sets an arranging position of the regeneration repeater as close as possible to a particular node of high priority (e.g., branch node). The predetermined algorithm may be, e.g., a method of arranging the regeneration repeater such that signal characteristics are similar between the regeneration repeating sections. Additionally, a selecting method of regeneration repeaters may be set to, e.g., sequentially select low-cost repeaters in order, or to select better performance repeaters as the regeneration repeating sections are longer.

Figure 4:
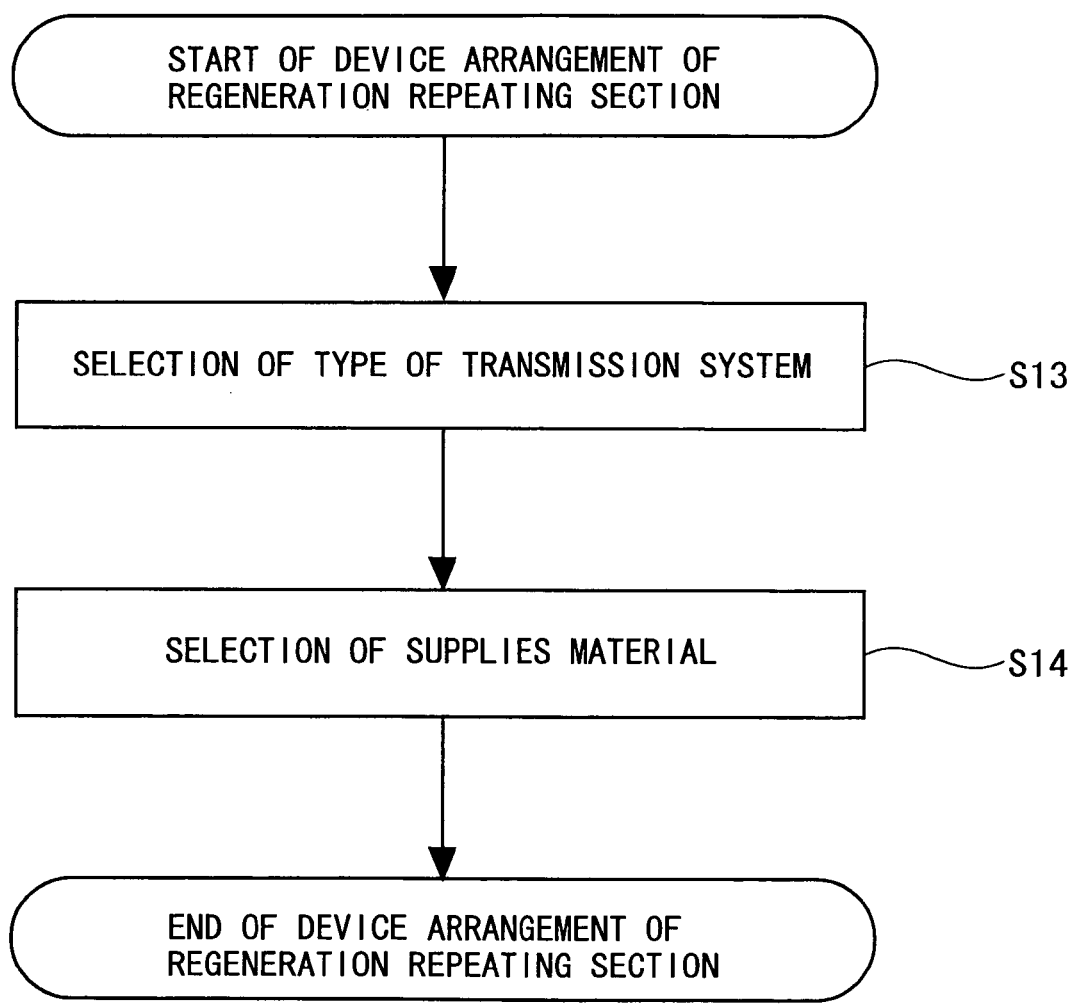
FIG. 4 is a flowchart showing a process of device arrangement in a regeneration repeating section.

Next, the section designing section 7 executes device arrangement of the regeneration repeating section (S5). In the processing, the section designing section 7 arranges a linear repeater, an OADM, or the like assigned by the user at a general node assigned by the user. FIG. 4 is a flowchart showing a device arranging process of the regeneration repeating section. Upon a start of the device arrangement, first, the section designing section 7 requests the user through the display section 2 to select a type of transmission system (S13).

In response to the request, the user can select a type of a building through the input section 3. For example, when Add and Drop are necessary to a client side of a path, the user can select a building in which an OADM is arranged. For other general nodes, linear repeaters are selected in principle. After the user has selected the type of the building, the section designing section 7 requests the user through the display section 2 to select a supplies material (S14). The supplies material selection means selection of a supplies material used for a device according to the type selected in S13. In response to the request, the user can select a supplies material through the input section 3. The user selects a supplies material name applied to each supplies material type according to a type of a device arranged in each building (e.g., the user makes selection according to FIGS. 10B and C, FIGS. 10B and C will be described later). Then, upon completion of the supplies material selection, the device arrangement of the regeneration repeater is completed. The device arrangement may be automatically executed based on the information input beforehand in S1.

Figure 5:
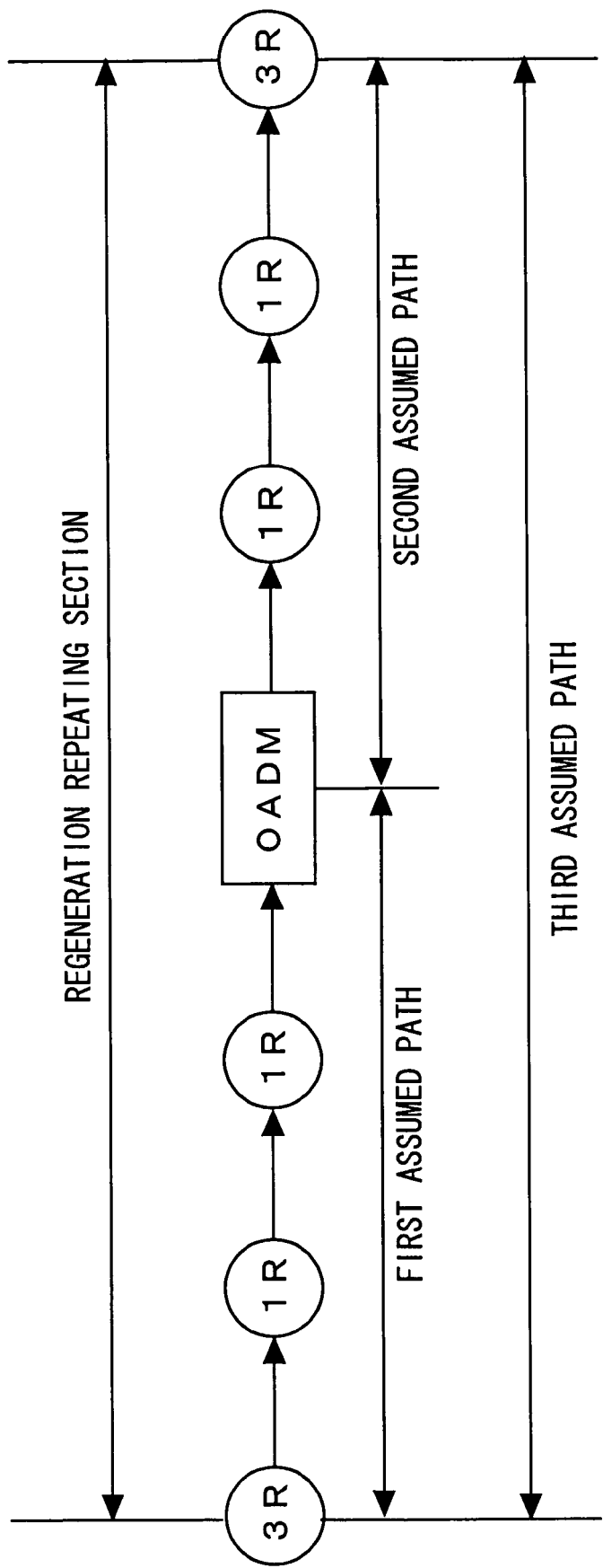
FIG. 5 is a diagram showing an example of an assumed path.

Next, the section designing section 7 executes assumed path extraction (S6). FIG. 5 is a diagram showing an example of an assumed path. When an OADM that executes ADD/DROP for an optical signal is arranged in the regeneration repeating section, the following assumed paths are extracted: an assumed path from one regeneration repeater to the OADM (first assumed path in FIG. 5); an assumed path from the other regeneration repeater to the OADM (second assumed path in FIG. 5); and an assumed path from one regeneration repeater to the other regeneration repeater (third assumed path in FIG. 5).

Next, the section designing section 7 determines transmission permission/inhibition for each extracted assumed path (S7). The section designing section 7 obtains performance of a device arranged at each node or characteristics of a fiber or the like between the nodes from a device information database (described in detail later) stored in the storage section 5, and executes transmission permission/inhibition determination. In the transmission permission/inhibition determination, whether or not an optical signal can be properly transmitted from one end of each assumed path to the other end. For a specific determining method of transmission permission/inhibition, any existing methods may be employed. Hereinafter, a specific example of a determining method which uses a Q value will be described.

The section designing section 7 calculates a Q margin according to an equation 1 (represented as Q_Min the equation 1). Incidentally, for each value in the equation 1, a value of the device information database stored in the storage section 5 is used. A value of a Q limit (represented as Q_l in the equation 1) is given beforehand by a designer or the user. For a Q improvement amount (represented as Q_m in the equation 1), a value of "Q VALUE IMPROVEMENT AMOUNT BY ERROR CORRECTION" of the device information database is used. The Q_1 indicates a deterioration amount by an SPM, a Q_2 indicates a deterioration amount by an XPM, a Q_3 indicates a deterioration amount by an FWM, a Q_4 indicates a deterioration amount by a PMD, and a Q_5 indicates the other deterioration amount. A value obtained by subtracting a total value thereof from a Q_t becomes a value of Q when a Q margin is obtained. For example, the section designing section 7 determines transmission inhibition when a Q margin is smaller than 0, a necessity of investigation when a Q margin is equal to/higher than 0 and less than 0.5, and adequate permission of transmission when a Q margin is equal to/higher than 0.5.

Figure 6:
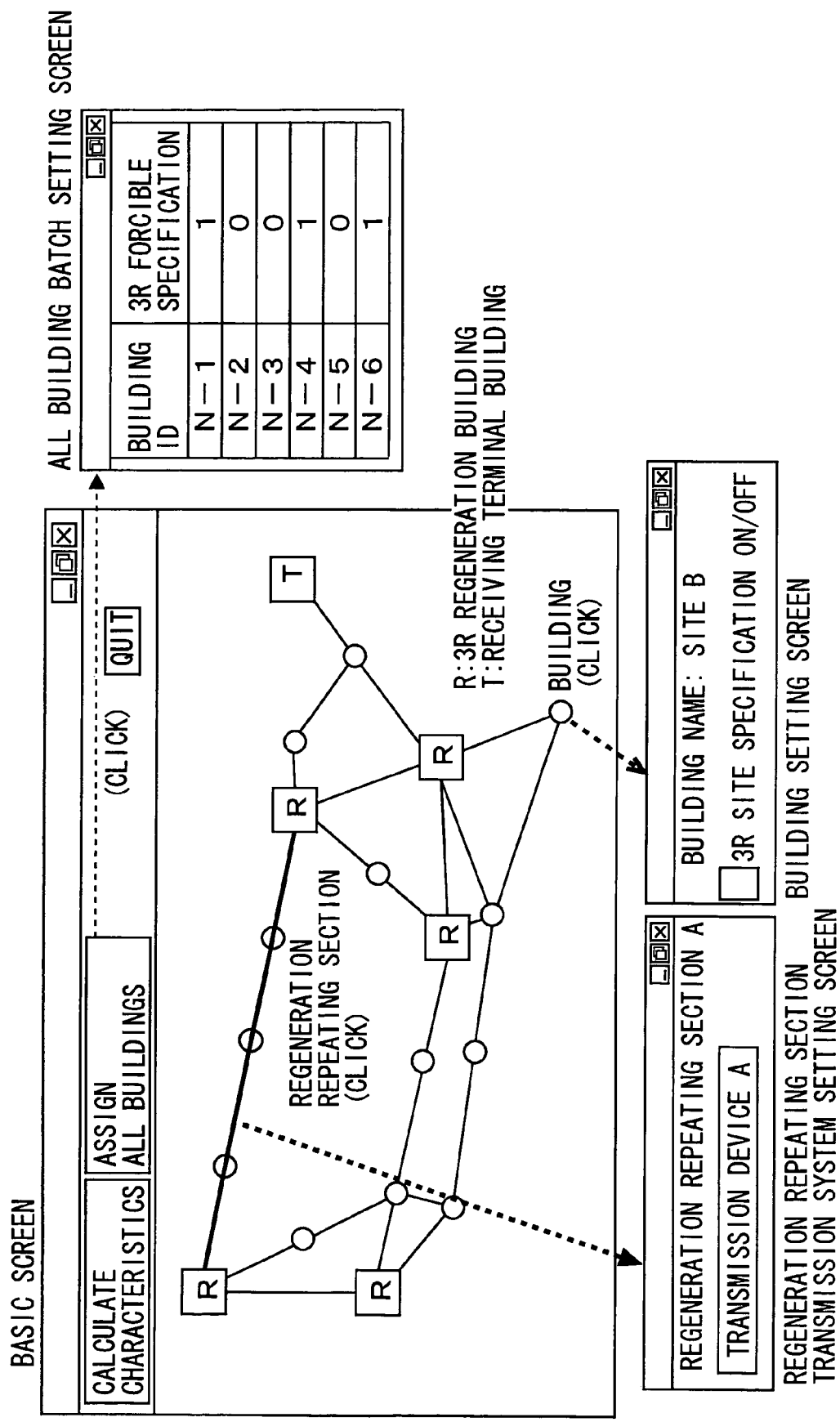
FIG. 6 is a diagram showing a display example of a transmission permission/inhibition determining result.

Next, the section designing section 7 causes the display section 2 to display a result of the transmission permission/inhibition determination. FIGS. 6 and 7 are diagrams showing display examples of regeneration repeater assigning and transmission permission/inhibition determining results. The section designing section 7 first causes the display section 2 to display a basic screen. On the basic screen, the section designing section 7 may visually express a designing margin of each assumed path. For example, the assumed path is displayed in red when a Q margin is smaller than 0, in pink or yellow when a Q margin is equal to/higher than 0 and less than 0.5, and in blue when a Q margin is equal to/higher than 0.5. The user may click a predetermined place on the basic screen displayed through the input section 3 to display more detailed information. For example, by clicking a regeneration repeating section, a device arranged in the regeneration repeating section or a value of a Q margin may be displayed, or a type of a transmission device of the regeneration repeating section may be selected. The user may click a node to display a device or a supplies material arranged in the node. The node may be selected for a regeneration repeating building, or a device to be arranged or a supplies material may be selected. Additionally, a constitution may be employed in which the user can click all building assigning buttons to assign detailed information for all the nodes, or a regeneration repeater or a device for each node. The user may click an assumed path display button to display a tree structure for the assumed path. Further, a constitution may be employed in which the user may click each assumed path to display detailed information for each assumed path.

Next, the section designing section 7 determines whether or not the user has made an input indicating the designing end (e.g., clicking of a quit button on the basic screen). The determination may be replaced by determination as to whether or not the user has changed the arranging position of the regeneration repeater or a supplies material. If there has been made an input indicating the designing end (S9—YES), or if the user has made no changes for a given period of time, the section designing section 7 allocates a wavelength for each channel, and executes output processing (S11, 12). On the other hand, if the user has made no input indicating the designing end for a given period of time, or if the user has input execution of redesigning (e.g., if a re-setting button is clicked) (S9—NO), the section designing section 7 prompts the user to re-set a regeneration repeater through the display section 2. Then, the section designing section 7 executes the processing of S4 to S9 again based on arrangement of the regeneration repeater re-set by the user.

<Storage Section>

The storage section 5 stores various programs (OS, application, and the like). Additionally, the storage section 5 stores the network information database or the device information database as information used for network designing. FIGS. 8A to 9B are diagrams showing specific examples of network information databases. FIGS. 10A to 12B are diagrams showing specific examples of device information databases.

First, the specific example of the network information database will be described. FIG. 8A shows data indicating information of a transmission line. From the data, a type, a length, characteristics, and the like of a fiber which interconnects the nodes can be known. FIG. 8B shows data indicating information of a building (node). From the data, a position of each building, an installed device, and a supplies material used for the device can be known. The installed device and supplies material are decided in the device arranging processing (S5) of the regeneration repeating section. FIG. 9A shows data indicating traffic demand information. From the data, necessary traffic start and end points, a signal type (bit rate), the number of channels, and the like can be known. The data shown in FIGS. 8A to 9A become input parameters for the network designing device 1. FIG. 9B shows data indicating assumed path information. From the data, a Q margin of each assumed path, a signal type, a transmitter/receiver, a building through which a signal is passed, and the like can be known. Each value of the Q margin is calculated in the transmission permission/inhibition determining processing (S7) of the assumed path, and recorded.

Next, the specific example of the device information database will be described. FIG. 10A shows data indicating basic information of an optical transmission device. From the data, basic information of each optical transmission device can be known. FIG. 10B shows data indicating a constitution of the optical transmission device. From the data, supplies material type names necessary for various optical transmission devices can be known. FIG. 10C shows data indicating a list of device supplies materials of the optical transmission device. From the data, specific supplies material names included in the supplies material types can be known. For example, the user can select one of "DCM-1" to "DCM-5" as a supplies material type "DCM". FIGS. 11A to 12B show data indicating bits of characteristic information of supplies materials (optical amplifier, dispersion compensator, MUX/DE-MUX, and transmitter/receiver). From the data, device characteristics of each supplies material can be known.

In the network designing device 1, a plurality of transmission devices whose data of FIGS. 10B to 12B are different can be registered in the database, whereby a transmission device different for each regeneration repeating section can be arranged. For example, two transmission devices whose numbers of supported wavelength multiplexing are different from each other are prepared, and each transmission device can be properly used according to the maximum number of wavelength multiplexing required for each regeneration repeating section. Generally, since the transmission line and each transmitter have wavelength dependences, longer-distance transmission is enabled as the number of supported wavelength multiplexing is smaller. Thus, the arrangement of the transmission devices different from each other in characteristics in the network counts in optimization.

In the network designing device 1 constituted in such a manner, the user can freely select arrangement of a device in each node for the network to be designed. Then, all the assumed paths are automatically extracted, and transmission permission/inhibition determination is executed for each assumed path. Accordingly, referring to a display of the result of the transmission permission/inhibition determination, the user can design optimal device arrangement of small equipment costs, i.e., an optimal network while guaranteeing signal quality reachability. Moreover, the number of steps of optical network designing can be reduced, which is very useful for practical purposes.

Figure 13:
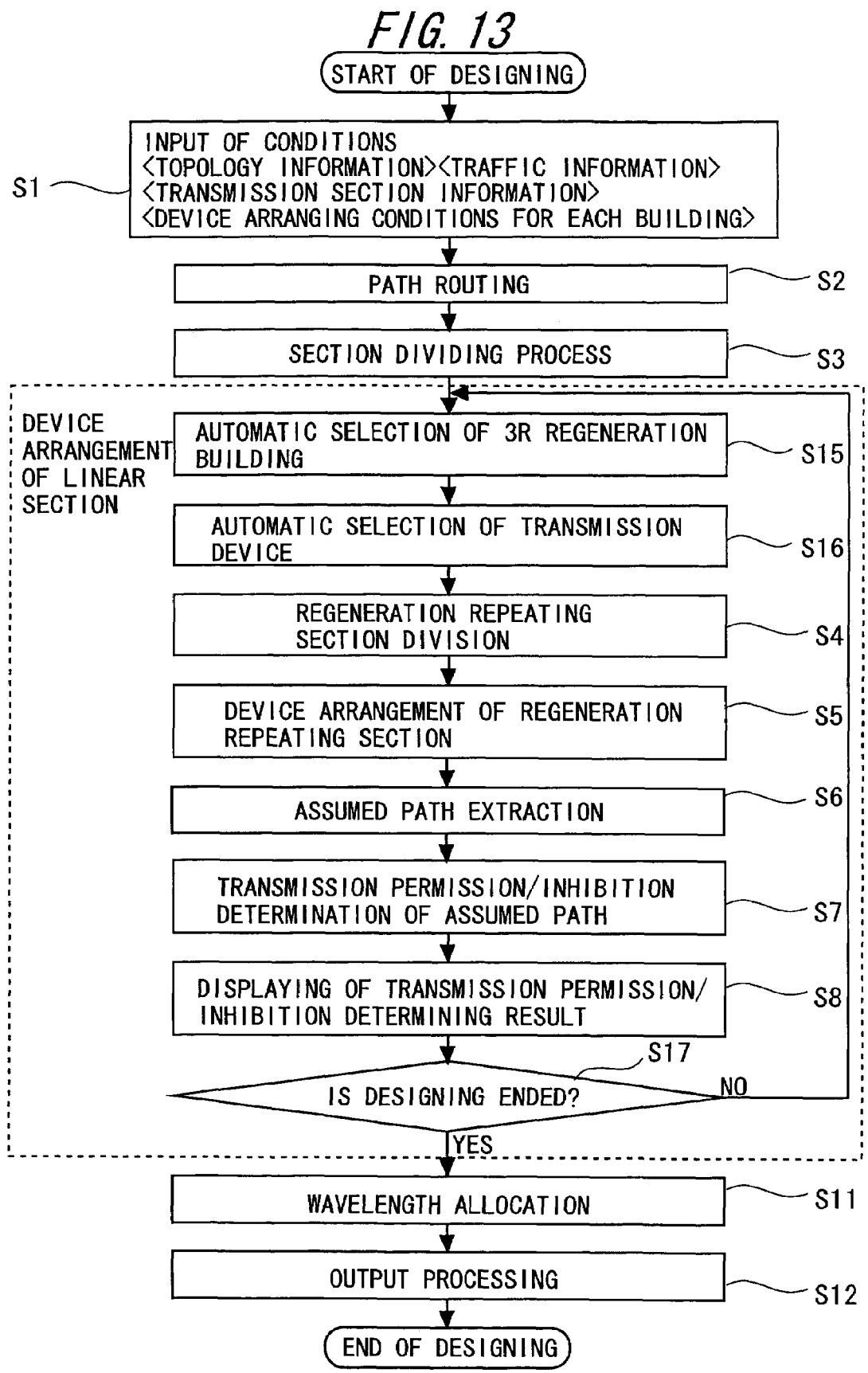
FIG. 13 is a flowchart showing a process flow according to a modified example of a network designing device.
Figure 14:
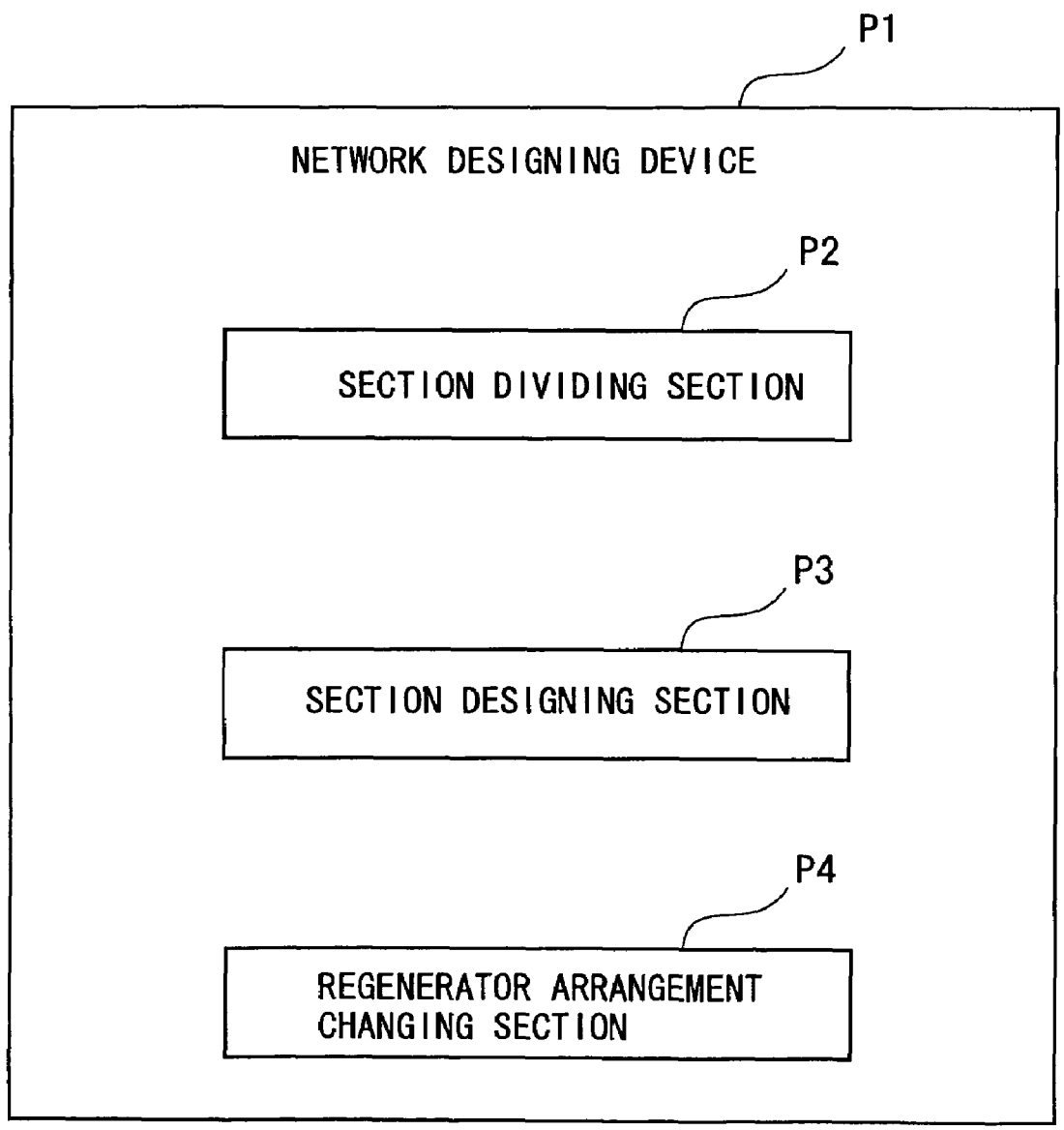
FIG. 14 is a diagram showing an example of a main function block in a conventional communication network designing device.
Figure 15:
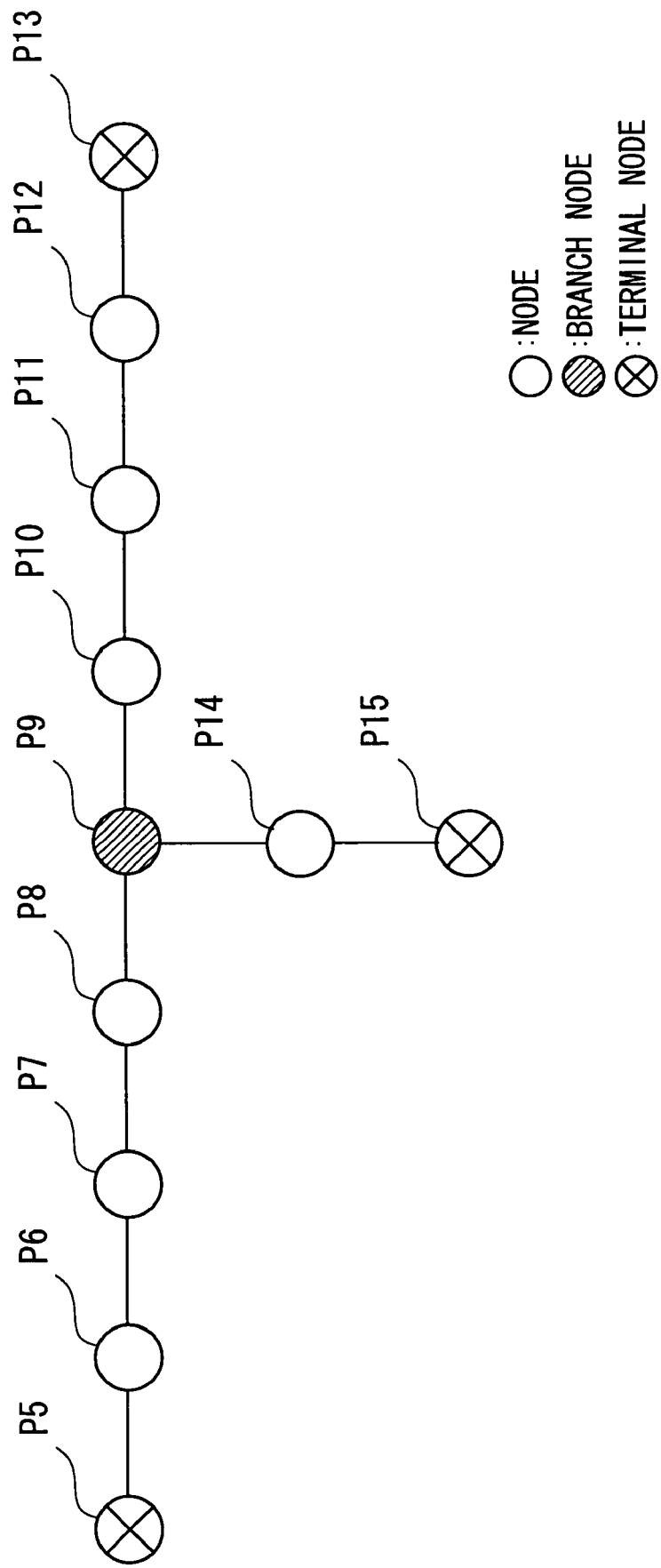
FIG. 15 is a diagram showing an example of a model of a conventional communication network.
Figure 16:
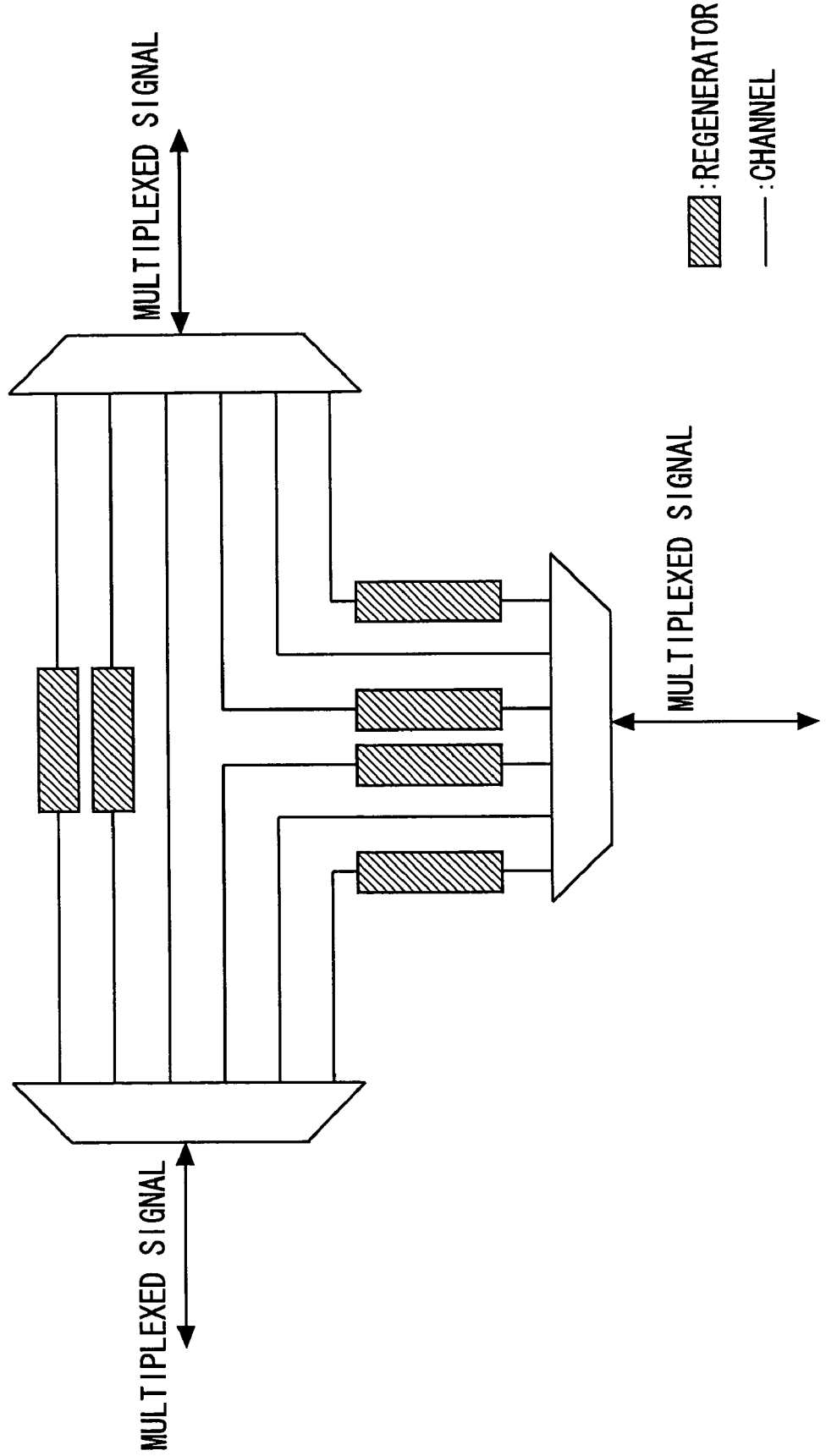
FIG. 16 is a diagram showing an arrangement example of a regenerator in a conventional HUB.
Figure 17:
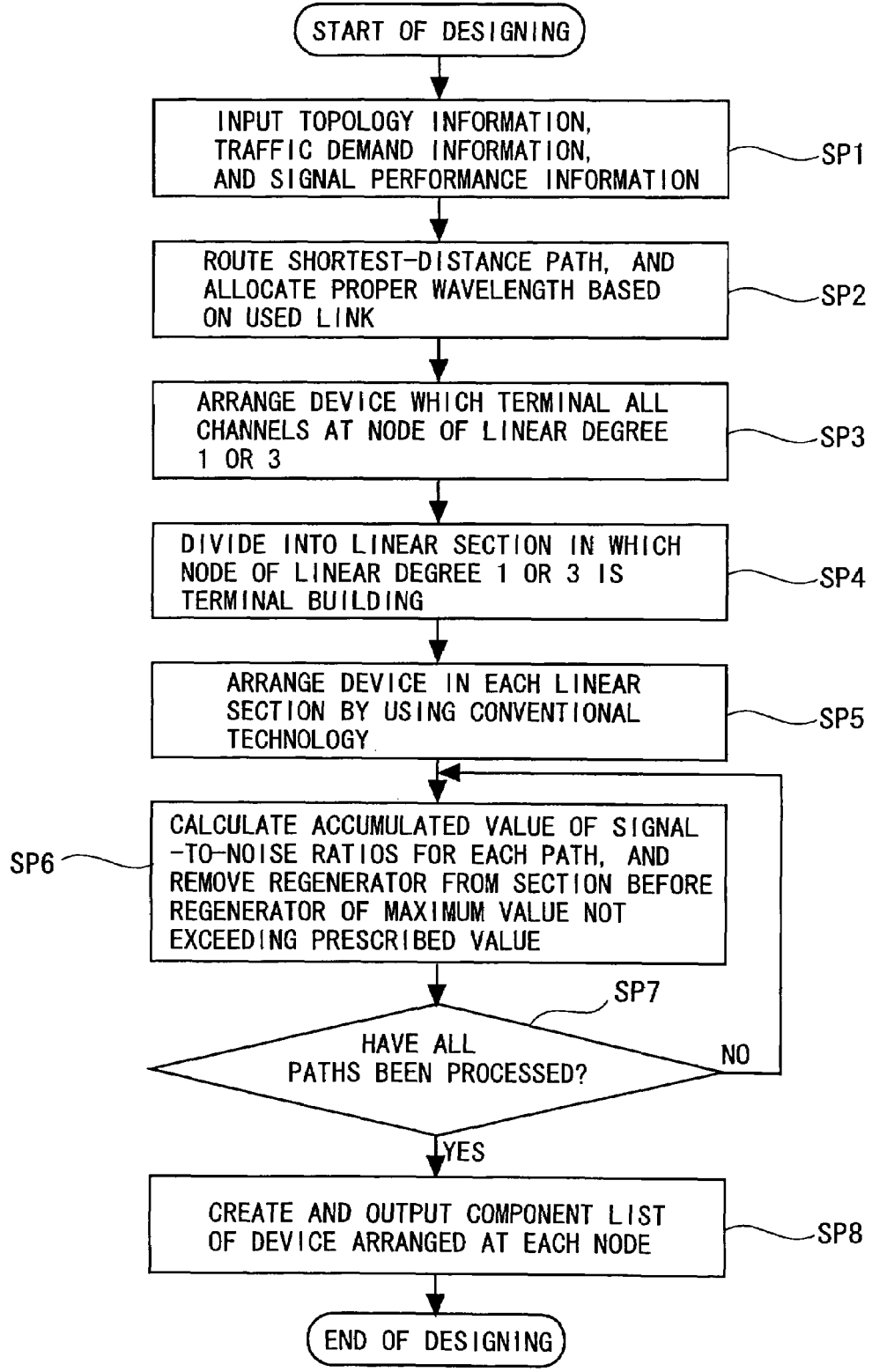
FIG. 17 is a diagram showing a designing flow by the conventional communication network designing device.
Figure 18:
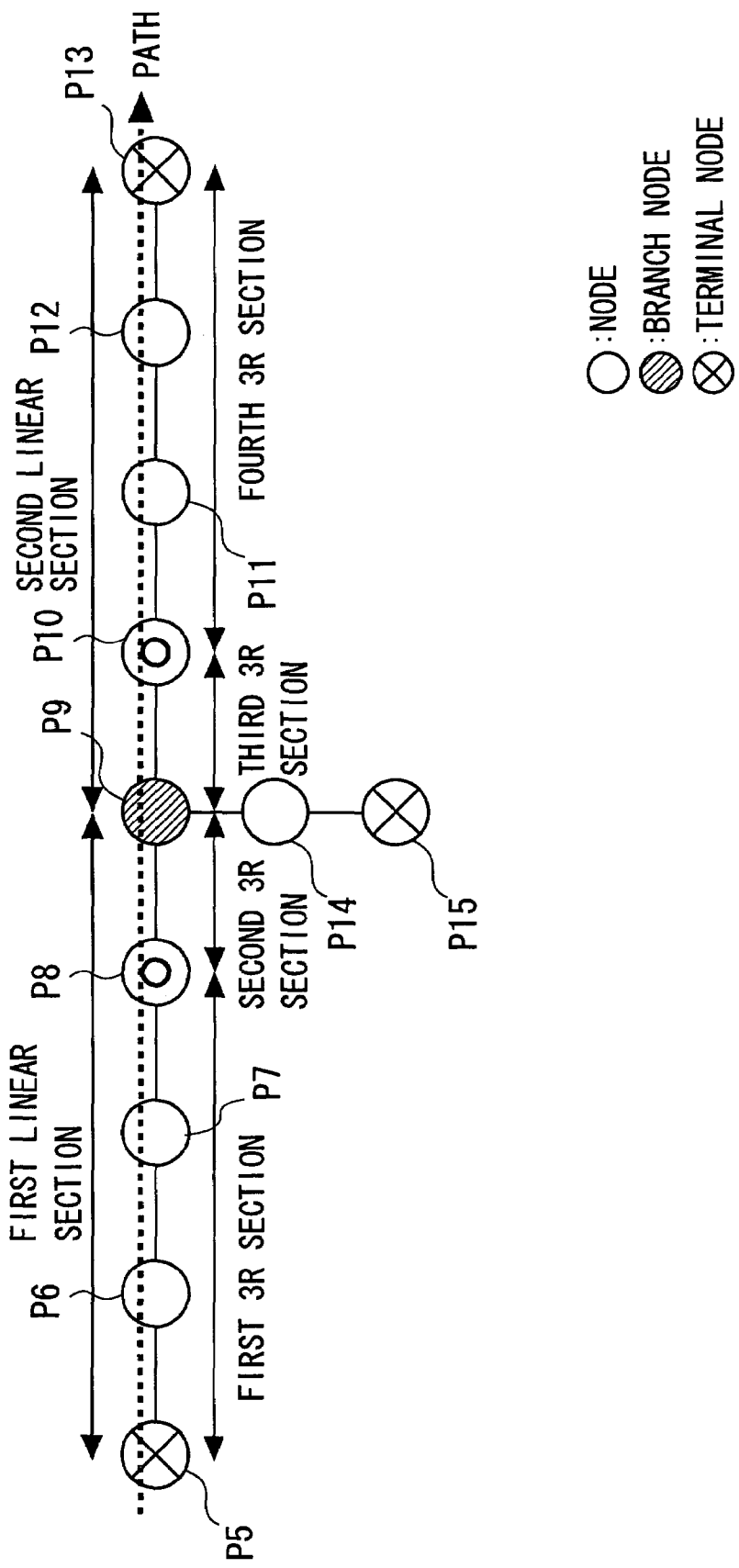
FIG. 18 is a diagram showing a specific example of a problem in a conventional network designing method.
Figure 19:
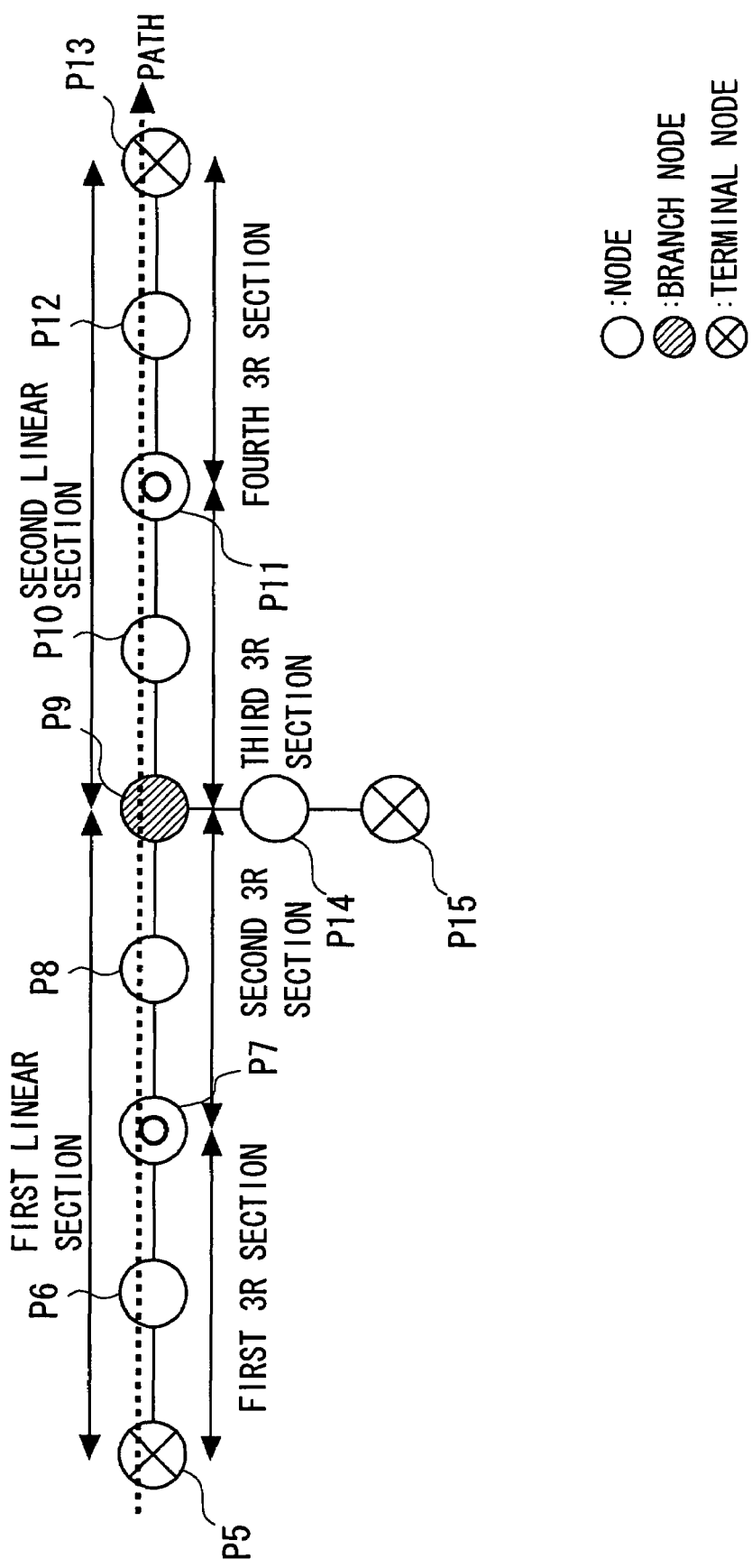
FIG. 19 is a diagram showing a specific example of the problem in the conventional network designing method.

Next, a modified example of the network designing device 1 will be described. According to the modified example, automatic optimization of network designing is realized. FIG. 13 is a flowchart showing a process flow of the network designing device 1 according to the modified example. Hereinafter, referring to FIG. 13, a specific process flow of the modified example of the network designing device 1 will be described. In FIG. 13, processing similar to that of FIG. 3 is denoted by a similar reference numeral, and description thereof will be omitted.

According to the network designing device 1 in the modified example, after the processing of S3, the section designing section 7 automatically selects a node (3R regeneration building) at which a regeneration repeater is arranged (S15). At this time, the section designing section 7 makes the selection according to a plurality of predetermined algorithms. The predetermined algorithm may be a method of arranging regeneration repeaters so as to bring, e.g., arranging positions thereof as close as possible to a particular node of high priority (e.g., branch node). The predetermined algorithm may be a method of arranging regeneration repeaters so as to set, e.g., signal characteristics similar among regeneration repeating sections. The selection method of the regeneration repeater may be set to sequentially select, e.g., repeaters of lower costs, or to select better performance repeaters as regeneration repeating sections are longer. In addition, such selection may be made according to any one of existing technologies or standards.

Then, the section designing section 7 automatically selects a supplies material for the regeneration repeater arranged in the selected 3R regeneration building (S16). At this time, e.g., based on costs or performance of each supplies material, the section designing section 7 selects a supplies material according to a predetermined standard. For example, when the user instructs cost importance, a supplies material of costs as low as possible is selected. Subsequently, the section designing section 7 executes processing of S4 to S8, compares and investigates a result of device arrangement and costs, and searches designing in which all the divided regeneration repeating sections permit transmission, and network costs are minimum (S17) Specifically, based on the number of trials, costs, and an execution time, the section designing section 7 exits from a designing loop if a value of each thereof reaches a target (S17—YES). On the other hand, if the value does not reach the target, the section designing section 7 executes processing after S15 again (S17—NO). At this time, the section designing section 7 arranges a regeneration repeater or the like by using an algorithm different from the algorithm used thus far. For example, in the case of algorithm of cost importance, a most inexpensive device may be selected for the first time, and a second inexpensive device may be selected in the case of a second loop. Additionally, if a designing result that permits transmission is not obtained, the section designing section 7 may try designing for various arranging patterns of a regeneration repeater while increasing the number of arranged regeneration repeaters one by one in the designing section. Then, the section designing section 7 may be constituted to notify the designing result to the user at a point of time when last end conditions are satisfied.

Incidentally, the section designing section 7 may be constituted to determine signal transmission permission/inhibition for network designing results according to a plurality of predetermined algorithms without executing the loop, and to select the network designing of a best result therefrom.

What is claimed is:

1. A network designing device comprising:
   a first dividing unit dividing a design object network in which more than two terminal nodes and more than one branch nodes are connected through some other nodes into a plurality of linear network, each linear network having one of the terminal nodes and one of the branch nodes at both ends of each linear network;
   an input unit allowing a user to assign, to the nodes in the linear networks, arrangement of regeneration repeaters or supplies materials thereof;
   a second dividing unit dividing the linear networks into a plurality of regeneration repeating sections by dividing at the nodes that the regeneration repeaters are assigned by the user;
   a device arranging unit arranging transmission devices at the nodes positioned in the regeneration repeating sections based on traffic information, building information, or transmission line information input by the user;
   a path extracting unit extracting a plurality of assumed paths assumed based on the result of arranging the transmission devices in the regeneration repeating sections;
   a determining unit determining transmission permission/inhibition for each assumed path; and
   a display unit displaying a result of the determination performed by the determining unit.

2. The network designing device according to claim 1, wherein the determining unit calculates a Q value indicating characteristics of an optical signal for each assumed path and determines transmission permission/inhibition based on the Q value.

3. The network designing device according to claim 1, wherein the display unit displays supplies materials of devices prestored in a database when the user selects the supplies materials of devices through the input unit.

4. A network designing device comprising:
   a first dividing unit dividing a design object network in which more than two terminal nodes and more than one branch nodes are connected through some other nodes into a plurality of linear networks, each linear network having on of the terminal nodes and one of the branch nodes at both ends of each linear network;

a assigning unit assigning, to the nodes in the linear networks, arrangement of regeneration repeaters or supplies materials thereof according to a plurality of different algorithms;

a second dividing unit dividing the linear networks into a plurality of regeneration repeating sections by dividing at the nodes that the regeneration repeaters are assigned by the assigning unit;

a device arranging unit arranging transmission devices at the nodes positioned in the regeneration repeating sections based on pre-input traffic information, building information, or transmission line information;

a path extracting unit extracting a plurality of assumed paths assumed based on the result of arranging the transmission devices in the regeneration sections;

a determining unit determining transmission permission/inhibition for each assumed path;

a selecting unit selecting one optimal network design from network designs which are designed according to the plurality of different algorithms, based on a result of the transmission permission/inhibition determination and costs for constructions; and a display unit displaying at least a determining result for the network design selected by the selecting unit.

5. The network designing device according to claim 4, wherein the selecting unit displays optimization target evaluation numerical values of results of the network designs executed according to the plurality of different algorithms.

6. A computer-readable medium recording a program embodied therein, the program being executed by a computer, the program comprising:

dividing a design object network in which more than two terminal nodes and more than one branch nodes are connected to through some other nodes into a plurality of linear networks, each linear network having one of the terminal nodes and one of the branch nodes at both ends of each linear networ;

receiving, from a user, indication to assign, to the nodes in the linear networks, arrangement of regeneration repeaters or supplies materials thereof:

dividing the linear networks into a plurality of regeneration repeating sections by dividing at the nodes that the regeneration repeaters are assigned by the user;

arranging transmission devices at the nodes positioned in the regeneration repeating sections based on traffic information, building information, or transmission line information input by the user;

extracting a plurality of assumed paths assumed based on the result of arranging the transmission devices in the regeneration repeating sections;

determining transmission permission/inhibition for each assumed path; and displaying a result of the determination.

7. A computer readable medium recording a program embodied therein, the program being executed by a computer, the program comprising:

dividing a design object network in which more than two terminal nodes and more than one branch nodes are connected through some other nodes into a plurality of linear networks, each linear network having one of the terminal nodes and one of the branch nodes at both ends of each linear network;

assigning to the nodes in the linear networks, arrangement of regeneration repeaters or supplies materials thereof according to a plurality of different algorithms;

dividing the linear networks into a plurality of regeneration repeating sections by dividing at the nodes that the regeneration repeaters are assigned;

arranging transmission devices at the nodes positioned in the regeneration repeating sections based on pre-input traffic information, building information, or transmission line information;

extracting a plurality of assumed paths assumed based on the result of arranging the transmission devices in the regeneration repeating sections;

determining transmission permission/inhibition for each assumed path;

selecting one optimal network design from network designs executed according to the plurality of different algorithms, based on a result of the transmission permission/inhibition determination and costs for construction; and displaying at least a determining result for the network design selected.

8. A network designing device comprising:

a first dividing unit dividing a design object network in which more than four nodes including at a branch node are connected through some nodes into a plurality of networks, each divided network having a terminal node and a branch node, a branch node and a branch node, or a terminal node and a terminal node at both ends and connecting some nodes cascaded between the both ends;

an input unit allowing a user to assign, to the nodes in the networks, arrangement of regeneration repeaters or supplies materials thereof;

a second dividing unit dividing the networks into a plurality of regeneration repeating sections by dividing at the nodes that the regeneration repeaters are assigned by the user;

a device arranging unit arranging transmission devices at the nodes positioned in the regeneration repeating sections based on traffic information, building information, or transmission line information input by the user;

a path extracting unit extracting a plurality of assumed paths assumed based on the result of arranging the transmission devices in the regeneration repeating sections; and a determining unit determining transmission permission/inhibition for each assumed path.

9. The network designing device according to claim 8, wherein the determining unit calculates a Q value indicating characteristics of an optical signal for each assumed path, and determines transmission permission/inhibition based on the Q value.

10. The network designing device according to claim 8, wherein the display unit displays supplies materials of devices prestored in a database when the user selects the supplies materials of devices through the input unit.

11. A network designing device comprising:

a first dividing unit dividing a design object network in which more than four nodes including at a branch node are connected through some nodes into a plurality of networks, each divided network having a terminal node and a branch node, a branch node and a branch node, or a terminal node and a terminal node at both ends and connecting some nodes cascaded between the both ends;

a assigning unit assigning, to the nodes in the networks, arrangement of regeneration repeaters or supplies materials thereof according to a plurality of different algorithms;

a second dividing unit dividing the networks into a plurality of regeneration repeating sections by dividing at the nodes that the regeneration repeaters are assigned by the assigning unit;

a device arranging unit arranging transmission devices at the nodes positioned in the regeneration repeating sections based on pre-input traffic information, building information, or transmission line information;

a path extracting unit extracting a plurality of assumed paths assumed based on the result of arranging the transmission devices in the regeneration repeating sections;

a determining unit determining transmission permission/inhibition for each assumed path; and a selecting unit selecting one optimal network design from network designs which are designed according to the plurality of different algorithms, based on a result of the transmission permission/inhibition determination and costs for construction.

12. The network designing device according to claim 11, wherein the selecting unit displays optimization target evaluation numerical values of results of the network designs executed according to the plurality of different algorithms.

13. A computer-readable medium recording a program embodied therein, the program being executed by a computer, the program comprising:

dividing a design object network in which more than four nodes including at a branch node are connected through some nodes into a plurality of networks, each divided network having a terminal node and a branch node, a branch node and a branch node, or a terminal node and a terminal node at both ends and connecting some nodes cascaded between the both ends;

receiving, from a user, indication to assign, to the nodes in the networks, arrangement of regeneration repeaters or supplies materials;

dividing the networks into a plurality of regeneration repeating sections by dividing at the nodes that the regeneration repeaters are assigned by user;

arranging transmission devices at the nodes positioned in the regeneration repeating sections based on traffic information, building information, or transmission line information input by the user;

extracting a plurality of assumed paths assumed based on the result of arranging the transmission devices in the regeneration repeating sections; and determining transmission permission/inhibition for each assumed path.

14. A computer-readable medium recording a program embodied therein, the program being executed by a computer, the program comprising:

dividing a design object network in which more than four nodes including at a branch node are connected through some nodes into a plurality of networks, each divided network having a terminal node and a branch node, a branch node and a branch node, or a terminal node and a terminal node at both ends and connecting some nodes cascaded between the both ends;

assigning, to the nodes in the networks, arrangement of regeneration repeaters or supplies material thereof according to a plurality of different algorithms;

dividing the networks into a plurality of regeneration repeating sections by dividing at the nodes that the regeneration repeaters are assigned;

arranging transmission devices at the nodes positioned in the regeneration repeating sections based on pre-input traffic information, building information, or transmission line information;

extracting a plurality of assumed paths assumed based on the result of arranging the transmission devices in the regeneration repeating sections;

determining transmission permission/inhibition for each assumed path; and selecting one optimal network design from network designs executed according to the plurality of different algorithms, based on a result of the transmission permission/inhibition determination and costs for construction.

* * * * *

UNITED STATES PATENT AND TRADEMARK OFFICE
CERTIFICATE OF CORRECTION

PATENT NO. : 7,505,414 B2
APPLICATION NO. : 10/992829
DATED : March 17, 2009
INVENTOR(S) : Hisao Nakashima et al.

It is certified that error appears in the above-identified patent and that said Letters Patent is hereby corrected as shown below:

On the Title Page, item (57) (Abstract), Line 8, after "determined" insert --for each assumed path, and after that, the determined--.

Column 12, Line 31, change "network," to --networks,--.

Column 12, Line 66, change "on" to --one--.

Column 13, Line 15, after "regeneration" insert --repeating--.

Column 13, Line 22, change "constructions;" to --construction;--.

Column 13, Line 35, after "connected" delete "to".

Column 13, Line 38, change "networ;" to --network;--.

Column 13, Line 41, change "thereof:" to --thereof;--.

Column 13, Line 65, change "assigning" to --assigning,--.

Column 16, Line 21, change "material" to --materials--.

Signed and Sealed this

Twenty-fifth Day of August, 2009

David J. Kappos
*Director of the United States Patent and Trademark Office*